United States Patent
Haltom et al.

(10) Patent No.: US 11,303,754 B1
(45) Date of Patent: Apr. 12, 2022

(54) RINGLESS VOICEMAIL ATTEMPT DETECTION

(71) Applicant: Verizon Patent and Licensing Inc., Basking Ridge, NJ (US)

(72) Inventors: Jeffrey Allen Haltom, Fishers, IN (US); Kent Lanier Hallford, Jr., McKinney, TX (US); Nayankumar Suryakant Patel, Warrington, PA (US); Lulia Ann Barakat, McKinney, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/147,645

(22) Filed: Jan. 13, 2021

(51) Int. Cl.
*H04M 3/533* (2006.01)

(52) U.S. Cl.
CPC ... *H04M 3/53325* (2013.01); *H04M 3/53383* (2013.01)

(58) Field of Classification Search
CPC ................ H04M 3/53325; H04M 3/53383
USPC .............. 379/67.1–88.28; 455/412.1–420; 370/351–357
See application file for complete search history.

(56) References Cited

U.S. PATENT DOCUMENTS

| | | | |
|---|---|---|---|
| 6,731,937 B1 * | 5/2004 | Spinner | H04M 3/48 455/414.1 |
| 2006/0183472 A1 * | 8/2006 | Nookala | H04W 76/18 455/426.1 |

\* cited by examiner

*Primary Examiner* — Hemant S Patel

(57) ABSTRACT

One or more computing devices, systems, and/or methods for ringless voicemail detection are provided. In an example, a first call attempt to a phone number may be detected. In response to detecting a second call attempt to the phone number occurring within a first threshold timespan of the first call attempt being detected, first processing of the second call attempt is withheld. In response to the first call attempt being cancelled within a second threshold timespan of the first call attempt being detected, second processing of the second call attempt is performed based upon a policy.

20 Claims, 12 Drawing Sheets

RINGLESS VOICEMAIL ATTEMPT DETECTION

BACKGROUND

Many communication service providers support voicemail. In an example, a call initiator may dial a phone number of a client communication device, such as a phone, a smart watch, or other communication enabled device, to initiate a call. If the call is not picked up within a certain amount of time, then the call may be routed to a voicemail associated with the phone number. In this way, the call initiator can leave a voicemail, such as an audio recording, that can be accessed through the client communication device. In another example, the call may be routed to the voicemail if there is already a pending call being established.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
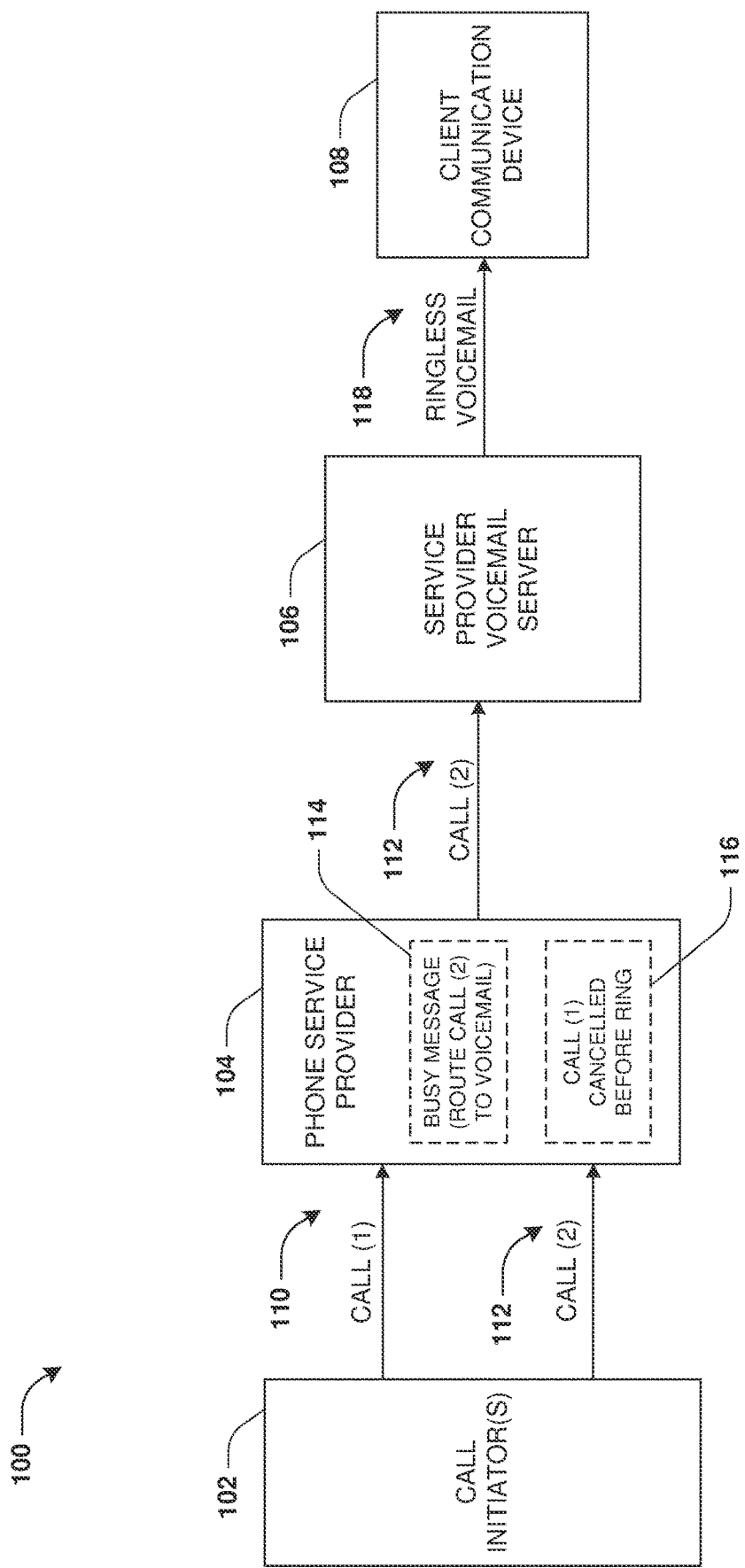
FIG. 1 is a diagram illustrating an example of ringless voicemail.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for ringless voicemail detection are provided. Ringless voicemail refers to a situation where a client communication device (e.g., a phone, a watch, a smart device, or other device with communication functionality) receives a voicemail message without the client communication device providing an alert of a phone call attempt that left the voicemail message, such as without ringing, vibrating, displaying an alert, etc. It may be appreciated that the techniques described herein for detecting ringless voicemail may pertain to various types of communication, such as calling a phone number, communicating through a session initial protocol (SIP) where a SIP uniform resource indicator (URI) is used to as a communication target/identifier, and/or other types of communication that may utilize other types of identifiers. Various techniques may be utilized by call initiators to deliver ringless voicemail messages to client communication devices. For example, a call initiator may perform a first call attempt to a phone number, and then a subsequent second call attempt to the phone number within a relatively short period of time of performing the first call attempt, such as within a second or less of the first call attempt. Because the first call attempt may cause a session initiation protocol to initiate the establishment of a phone call session, the session initiation protocol may generate a busy code (e.g., an "establishing another call" code) for the second call attempt because the phone call session with the phone number is already being established for the first call attempt. In this way, the second call attempt is routed to a service provider voicemail service in order to leave a voicemail message for the phone number. The call initiator may cancel the first call attempt (e.g., within 2 seconds or less) before the client communication device alerts a user of an incoming phone call associated with the first call attempt. Thus, the voicemail message is a ringless voicemail message because a voicemail is left for the client communication device without the device ringing or providing a notification/alert since the first call attempt is cancelled before the client communication device rings or provides the alert.

Ringless voicemail is very pervasive; millions of ringless voicemail messages are occurring every day, and there are even ringless voicemail providers that provide ringless voicemail distribution services to other entities. These ringless voicemail messages are problematic because the ringless voicemail messages can comprise spam messages, fraudulent messages (e.g., messages attempting to have users call back with personal or financial information in order to use such information for malicious purposes), messages left by robocallers, etc.

Accordingly, as provided herein, ringless voicemail attempts are detected and processed based upon various policies. A first call attempt to a phone number is detected at a first point in time. In some examples, a timer may be started at the first point in time in response to detecting the first call attempt. A second call attempt to the phone number is detected at a second point in time. A determination may be made, such as by evaluating the timer, as to whether the second point in time of the second call attempt to the phone number occurred within a first threshold timespan of the first point in time of the first call attempt to the phone number. This is done by comparing a current value of the timer at the second point in time to the first threshold timespan to see if the current value of the timer is less than or equal to the first threshold timespan. The first threshold timespan may be set and/or modified based upon various factors that are indicative of a ringless voicemail attempt. In some examples, the first threshold timespan may be set to about 2 seconds or some other value, which may correspond to a timespan within which the first call attempt would be cancelled before the first call attempt would cause a client communication device to provide an alert, such as ringing. In some examples, the first threshold timespan may be set to about 200 milliseconds or some other value corresponding to an average timespan during which two call attempts are performed when call initiators are attempting to generate ringless voicemail messages. In other embodiments, the timespan may be determined or adjusted algorithmically as more ringless voicemail attempts are detected.

In response to the second call attempt to the phone number occurring within the first threshold timespan of the first call attempt being detected, first processing of the second call attempt is withheld. In some embodiments, the first processing may correspond to a session initiation protocol (SIP) generating a busy code (e.g., a SIP "establishing another call" code) because the session initiation protocol may have already initiated the establishment of a phone call session for the first call attempt with the phone number. However, the first processing is withheld and/or the busy code is not generated because the second call attempt occurred within the first threshold timespan of the first call attempt being detected because the first call attempt and the second call attempt may be a ringless voicemail attempt.

A determination may be made as to whether the first call attempt is cancelled within a second threshold timespan of the first call attempt being detected. In some examples, the timer (or a different timer) may be evaluated to determine whether the first call attempt to the phone number is cancelled within the second threshold timespan by determining whether the first call attempt is cancelled before the timer times out. A timeout value of the timer may be set based upon the second threshold timespan. In some examples, the second threshold timespan may be set to about 2 seconds or some other value, which may correspond to a timespan within which the first call attempt could still be cancelled in a manner where the client communication device would not provide an alert of the first call attempt. If the first call attempt is not cancelled within the second threshold timespan, then the first processing of the second call attempt is no longer withheld. Accordingly, the first processing is performed upon the second call attempt, such as by generating the busy code and routing the second call attempt to voicemail associated with the phone number or by attempting to establish a phone call session for the second call attempt.

If the first call attempt is cancelled within the second threshold timespan of the first call attempt being detected, then second processing of the second call attempt is performed based upon a policy. In some examples, the policy may be selected from a set of policies, such as from a policy table, based upon identified criteria of the first call attempt and/or the second call attempt matching criteria of the policy. The identified criteria and/or the criteria may correspond to an originating calling number of the first call attempt and/or the second call attempt, a portion of the originating calling number (e.g., whether the originating calling number starts with a particular set of numbers), locational information associated with the originating calling number, a time of day associated with the first call attempt and/or the second call attempt, whether the originating calling number is within a particular set of calling numbers or is excluded from the set of calling numbers, timestamp information associated with the originating calling number, etc.

In some examples, the policy may specify that the second processing is to deny/block the second call attempt, such as where the session initiation protocol returns a SIP 603 declined message. In some examples, the policy may specify that the second processing is to route the second call attempt to a captcha challenge (e.g., a captcha audio challenge may be provided to a call initiator of the second call attempt). If the captcha challenge is failed, then the second call attempt is denied/blocked, otherwise, the second call attempt may be allowed to proceed such as by being routed to voicemail associated with the phone number. In some examples, the policy may specify that the second processing is to play a recorded message to the call initiator of the second call attempt. Once the call initiator has listened to the recorded message, then the second call attempt may be allowed to proceed such as by being routed to voicemail associated with the phone number. In some examples, the policy may specify that the second processing is to block the second call attempt from being routed to the voicemail associated with the phone number.

In some examples, the policy may specify that the second processing is to route the second call attempt to the voicemail associated with the phone number. In some examples, the policy may additionally specify that if the second call attempt is routed to the voicemail associated with the phone number, then a message (e.g., a text message to the phone number, an email to an email address, a push notification, etc.) is to be provided to a user associated with the phone number to indicate that a voicemail message from the second call attempt may potentially be spam. In some examples, the policy may additionally specify that if the second call attempt is routed to the voicemail associated with the phone number, then a warning label may be display for a voicemail message resulting from the second call attempt (e.g., the warning label may comprise text displayed relative to the voicemail message within a voicemail user interface displayed on the client communication device associated with the phone number). Other user interface elements may also be displayed through the voicemail user interface, such as a report button for the user to report the voicemail message as spam, a safe button for the user to indicate that the voicemail message was received from a safe/trusted source, a delete button for the user to delete the voicemail message, a block button to block the call initiator/originating calling number, etc. In a further embodiment, SIP processing may be modified by allowing only one call to a specific destination address. Alternatively, if a telephony application server identifies a call that is in setup state, then the telephony application server is configured to not return an established another call code (e.g., a 486 Establishing Another Call that would otherwise route to call to voicemail), but rather deny using another code that would not allow the call to flow to voicemail. In a further embodiment, a flag or other data structure may be set (e.g., set to true or some other value) by an SIP architecture during the initiation of a first call. If a second call is received while the flag is set due to the SIP architecture still trying to initiate/setup the first call, then the second call is blocked from being routed to voicemail. Once the first call is fully initiated, then the flag is set to false or is cleared. In this way, various processing actions can be implemented for a ringless voicemail attempt in order to block and/or warn users of ringless voicemail messages so that users are not being inundated with ringless voicemail spam messages and to protect users from malicious entities utilizing ringless voicemail messages to scam such users. This can significantly improve the experience of users and protect users at a large scale as millions of ringless voicemail messages could otherwise occur every single day.

FIG. 1 illustrates an example 100 of ringless voicemail. A phone service provider 104 may provide communication functionality for client communication devices, such as for a phone number associated with a client communication device 108 (e.g., a phone, a watch, a smart device, or other device with communication functionality). In some examples, the phone service provider 104 may provide telephony-related feature implementations using various networking technologies (e.g., various generations of wireless networks, Ethernet/IP-based networks, OTT applications, TDM based telephony systems, Public Branch Exchange (PBX) systems, call centers, Call Processing as a Service (CPaas) technologies, etc.). In some examples, the phone service provider 104 may implement services using a session initiation protocol (SIP), applications servers, an IP multimedia subsystem (IMS), voice over IP (VoIP) facilities, etc. A service provider voicemail server 106 may provide voicemail services for the client communication devices, such as for the phone number associated with the client communication device 108.

In some examples, call initiators 102 (e.g., a communication device such as a telephone, a communication application configured to initiate phone calls, etc.) may utilize the phone service provider 104 in order to establish phone call sessions with the client communication device 108. For example, a call initiator may dial the phone number of the client communication device 108, which may be transmitted over a network (e.g., a cellular network, a wireless network, or any type of communication network) to the phone service provider 104 as a call attempt from an originating calling number of the call initiator to the phone number of the client communication device 108. The phone service provider 104 may utilize various telephony-related feature implementations and/or networking technologies, such as a session initiation protocol to establish a phone call session between the call initiator and the client communication device 108. In this way, the call initiator may communicate with the client communication device 108 through the phone call session.

In some situations, the phone service provider 104 may not establish the phone call session, and may instead perform other actions upon the call attempt. For example, if there is already a phone call session being established to the phone number with the client communication device 108 such as by a prior call attempt, then a busy code may be generated, such as a SIP "establishing another call" code. The busy code may cause the call attempt to be routed to the service provider voicemail server 106 so that the call attempt can be directed to the voicemail of the phone number associated with the client communication device 108. In another example, if a user of the client communication device 108 does not answer the call attempt after a certain amount of time or certain number of rings, then the call attempt may be routed to the service provider voicemail server 106 so that the call attempt can be directed to the voicemail of the phone number associated with the client communication device 108. In this way, the call initiator can leave a voicemail that can be accessed through the client communication device 108.

Generally, when the call initiator calls the client communication device 108, the client communication device 108 may ring one or more times or provide another type of alert (e.g., vibration, a visual notification, etc.) to alert a user to answer the call before the call attempt is routed to the voicemail of the client communication device 108. This gives the user the ability to assess the originating calling number to determine whether the user wants to answer the call or ignore the call, such as because the originating calling number is unknown to the user and appears to be spam thus putting the user on notice that the user should ignore/delete the spam voicemail that may be left by the call initiator. Unfortunately, certain call initiators, such as robocallers, spammer, and other entities, may attempt to deliver voicemails to the client communication device 108 without alerting the user, which may be referred to as ringless voicemail messages. In some examples, the ringless voicemail messages may comprise messages relating to spam, fraudulent attempts to solicit financial or personal information from users, false information, and/or other content ranging from annoying users to scamming users. Ringless voicemail messages are very pervasive, and millions of ringless voicemails may occur every day.

In the example 100 of ringless voicemail, a call initiator may generate a first call attempt 110 to the phone number of the client communication device 108. The first call attempt 110 may be transmitted over the network to the phone service provider 104. The phone service provider 104, using a method such as a session initiation protocol, may initiate the establishment of a phone call session between the call initiator and the client communication device 108. Within a relatively short time span (e.g., less than 2 seconds, such as around 100 milliseconds or some other timespan before which the phone call session causes the client communication device 108 to ring or provide an alert), the call initiator may generate a second call attempt 112 to the phone number of the client communication device 108. The second call attempt 112 may be transmitted over the network to the phone service provider 104. Because the phone service provider 104 may be initiating the establishment of the phone call session between the call initiator and the client communication device 108 based upon the first call attempt, the phone service provider 104 may generate a busy code for the second call attempt 112. Accordingly, the second call attempt 112 may be routed 114 to the service provider voicemail server 106 based upon the busy code so that the call initiator can leave a voicemail message accessible through the client communication device 108.

The voicemail message will be a ringless voicemail message 118 if the call initiator cancels 116 the first call attempt 110 before the client communication device 108 is rung based upon the first call attempt 110. In some examples, if the call initiator cancels 116 the first call attempt 110 (hangs up) within a certain timespan (e.g., less than 2 seconds), then the client communication device 108 will not ring or provide an alert. In this way, the ringless voicemail message 118 is delivered to a voicemail associated with the phone number of the client communication device 108 without the client communication device 108 ever ringing. Ringless voicemail messages allow entities, such as robocallers and spammers, to silently deliver voicemail message that may be annoying to users and/or attempt to scam the users.

Accordingly, as provided herein, ringless voicemail attempts are detected and processed based upon various policies so that ringless voicemail attempts may be blocked and/or ringless voicemail messages may be labeled as spam in order to warn users.

Figure 2:
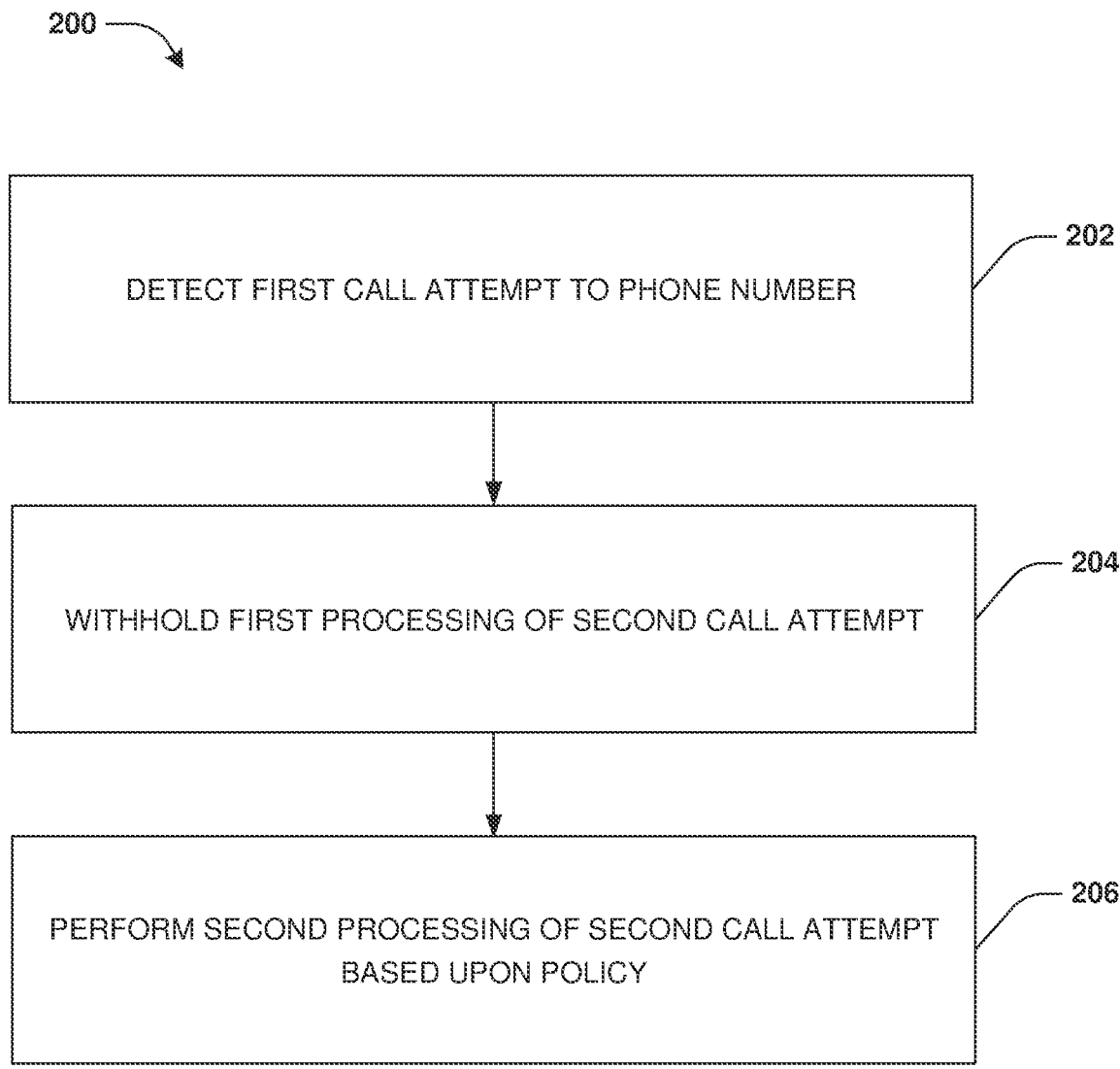
FIG. 2 is a flow chart illustrating an example method for detecting ringless voicemail attempts.
Figure 3:
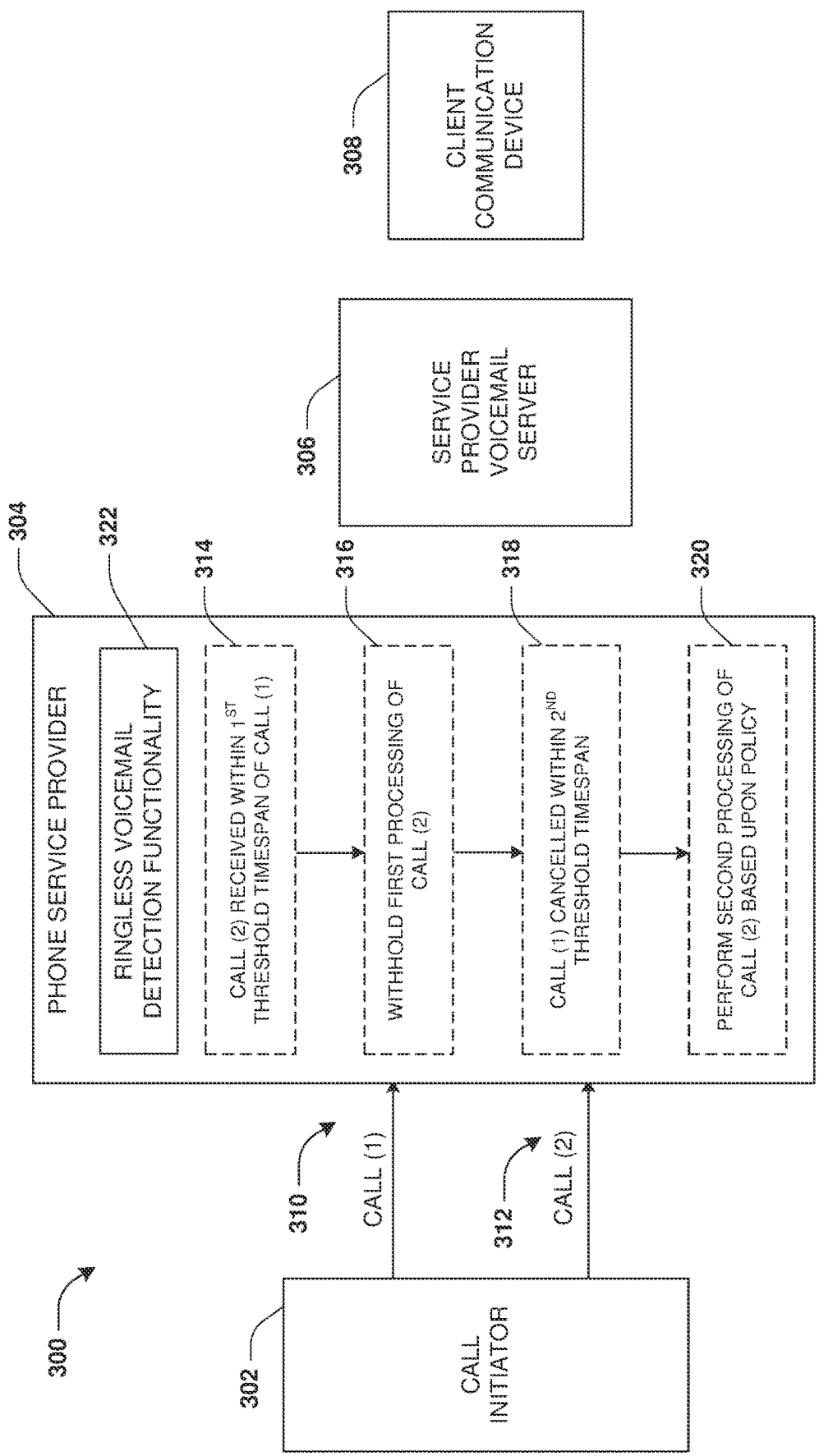
FIG. 3 is a diagram illustrating an example scenario associated with detecting ringless voicemail attempts.

An embodiment of detecting ringless voicemail attempts is illustrated by an exemplary method 200 of FIG. 2, which are further described in conjunction with system 300 of FIG. 3. A phone service provider 304 may be configured to implement ringless voicemail detection functionality 322 to identify ringless voicemail attempts and process the ringless voicemail attempts based upon policies matching criteria associated with the voicemail attempts in order to block ringless voicemail attempts and/or warn users of ringless voicemail messages. A client communication device 308 may be associated with a phone number registered with the phone service provider 304 (e.g., a phone number of a smart phone, a smart watch, a computing device, a mobile device, a telephone, or any other type of device with communication functionality). The phone service provider 304 may provide telephony-related feature implementations using various networking technologies for the client communication device 308 and/or other client communication devices such as a client communication device of a call initiator 302. In some examples, the phone service provider 304 may implement services using a session initiation protocol (SIP), applications servers, an IP multimedia subsystem (IMS), voice over IP (VoIP) facilities, etc. A service provider voicemail server 306 may provide voicemail services for the client communication devices, such as for the phone number associated with the client communication device 308.

The call initiator 302 may generate a first call attempt 310 by dialing the phone number of the client communication device 308. In some examples, the call initiator 302 may utilize a client communication device, a communication application, or other communication hardware and/or software to generate the first call attempt 310 and to transmit the first call attempt 310 over a network to the phone service provider 304, such as a wireless network, a cellular network, or any other type of communication network. During operation 202 of method 200, the first call attempt 310 to the phone number of the client communication device 308 is detected, such as by the ringless voicemail detection functionality 322 of the phone service provider 304. In some examples, the ringless voicemail detection functionality 322 may be implemented as a standalone component hosted by the phone service provider 304. In some examples, the ringless voicemail detection functionality 322 may be integrated into one or more of the telephony-related feature implementations of the phone service provider 304, such as being integrated into a session initiation protocol (SIP) implemented by the phone service provider 304. The first call attempt 310 may be detected at a first point in time by the ringless voicemail detection functionality 322 of the phone service provider 304.

The call initiator 302 may generate a second call attempt 312 to the phone number of the client communication device 308. The call initiator 302 may transmit the second call attempt 312 over the network to the phone service provider 304. The ringless voicemail detection functionality 322 of the phone service provider 304 may detect the second call attempt 312 at a second point in time. The ringless voicemail detection functionality 322 may determine whether the second call attempt 312 occurred within a first threshold timespan of the first call attempt 310. In some examples, a first timestamp of the first call attempt 310 being received/detected at the first point in time may be compared with a second timestamp of the second call attempt 312 being received/detected at the second point in time to determine whether a difference between the second timestamp (the second point in time) and the first timestamp (the first point in time) is less than or equal to the first threshold timespan. In some examples, a timer may be started once the first call attempt 310 is received/detected at the first point in time. A current value of the timer may be identified at the second point in time when the second call attempt 312 is received/detected. The current value of the timer may be compared to the first threshold timespan to determine whether the current value is less than or equal to the first threshold timespan. The first threshold timespan may be predefined, modified over time manually or dynamically, and/or dynamically determined on a periodic basis based upon various factors, such as where the first threshold timespan is set based upon an average time between sequential call attempts by call initiators to phone numbers that would result in ringless voicemail messages (e.g., 200 milliseconds or less, or some other time value), recent ringless voicemail call attempts, and the like.

In some examples, if the second call attempt 312 does not occur within the first threshold timespan, then the ringless voicemail detection functionality 322 of the phone service provider 304 does not perform additional processing (second processing) on the second call attempt 312, and the second call attempt 312 is processed as normal using first processing. In some examples of the first processing, a busy code may be generated for the second call attempt 312 because a phone call session is being already being established for another call attempt such as the first call attempt 310 between the call initiator 302 and the phone number of the client communication device 308 (e.g., the session initiation protocol may generate a "establishing another call" code). The busy code may cause the second call attempt 312 to be routed to the service provider voicemail server 306 for leaving a voicemail for the phone number. In some examples, the second call attempt 312 is processed by the first processing to establish a phone call session with the phone number of the client communication device 308, which may cause the client communication device 308 to ring or alert the user.

In some examples, the ringless voicemail detection functionality 322 may determine 314 that the second call attempt 312 was received within the first threshold timespan of the first call attempt 310. Accordingly, during operation 204 of method 200, the first processing (normal call attempt processing) of the second call attempt 312 is withheld 316, such as where the session initiation protocol does not generate the busy code for the second call attempt 312 that would otherwise be generated because the phone call session for the first call attempt 310 is being established and would otherwise cause the second call attempt to be routed to the voicemail of the phone number.

The ringless voicemail detection functionality 322 may monitor the first call attempt 310 to determine whether the first call attempt 310 is cancelled within a second threshold timespan of the first call attempt 310 being detected at the first point in time. The second threshold timespan may correspond to a timespan before which the first call attempt 310 will successfully establish the phone call session and the client communication device 308 rings, vibrates, displays a notification, or otherwise alerts a user of an incoming call based upon the first call attempt 310 (e.g., within 2 seconds or less, or some other timespan). In some examples, if the first call attempt 310 is not cancelled, then the first processing of the second call attempt 312 is no longer withheld, and the second call attempt 312 is processed as normal by the first processing (e.g., routed to the service provider voicemail server 306 and directed to the voicemail associated with the phone number; processed to establish a phone call session within the phone number of the client communication device 308; etc.).

In some examples, the ringless voicemail detection functionality 322 may determine 318 that the first call attempt 310 is cancelled within the second threshold timespan. Accordingly, during operation 206 of method 200, second processing of the second call attempt 312 is performed 320 by the ringless voicemail detection functionality 322 based upon a policy. In some examples, a single policy is defined for such call attempts. In some examples, different policies may be defined for call attempts corresponding to certain criteria. For example, criteria associated with the first call attempt 310 and/or the second call attempt 312 may be identified as identified criteria. The identified criteria may correspond to an originating calling number of the first call attempt 310 and/or the second call attempt 312, a portion of the originating calling number (e.g., whether the originating calling number starts with a particular set of numbers), locational information associated with the originating calling number, a time of day associated with the first call attempt 310 and/or the second call attempt 312, whether the originating calling number is within a particular set of calling numbers or is excluded from the set of calling numbers, timestamp information associated with the originating calling number, etc. The identified criteria may be used to select a policy from a set of policies based upon the policy being mapped to the identified criteria.

Figure 4:
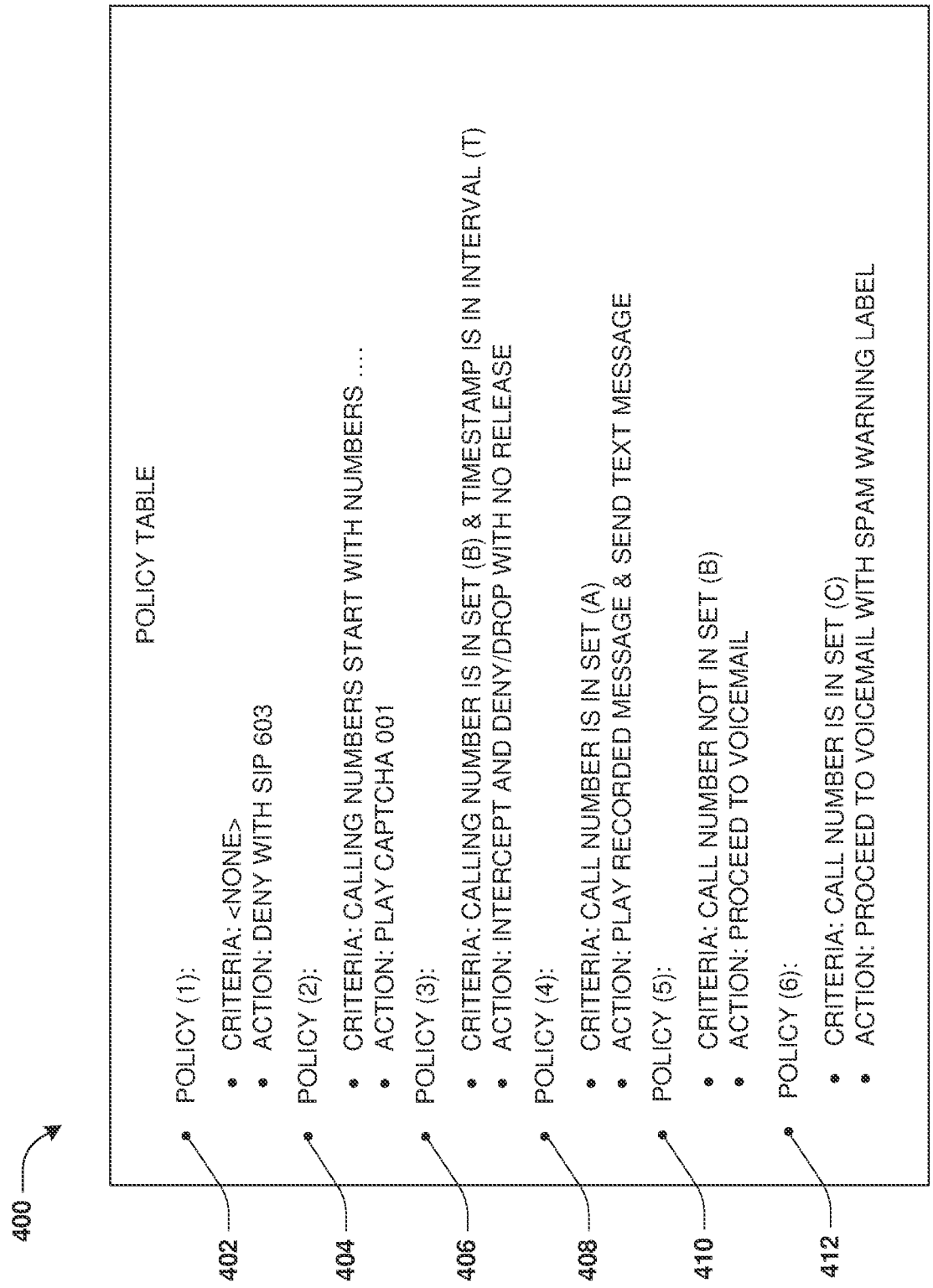
FIG. 4 is an illustration of an example policy table used for processing ringless voicemail attempts.

In some examples, the policy may be selected from a structure comprising the set of policies, such as a policy table 400 of FIG. 4. The policy table 400 may be populated with polices mapped to criteria, which may be updated over time based upon statistical analysis of call attempts (e.g., new policies may be defined, policies may be removed, policies may be modified to change criteria mapped to the policies or change what actions are to be performed, etc.). In some examples, the policy table 400 may comprise a first policy 402. The first policy 402 may not be mapped to any criteria, and thus the first policy 402 may be applied as a default policy for when the identified criteria of the first call attempt 310 and/or the second call attempt 312 does not match criteria of other policies. The first policy 402 may specify that the second processing is to deny the second call attempt 312, such as with a session initiated protocol (SIP) 603 code.

In some examples, the policy table 400 may comprise a second policy 404. The second policy 404 may be mapped to criteria specifying that the second processing is to play a particular captcha message for the second call attempt 312 if the identified criteria indicates that the originating calling number starts with a particular number(s). Other policies with other criteria may specify that other captcha messages are to be played. If the call initiator fails to correctly answer a captcha challenge within the captcha message, then the second call attempt 312 may be denied, otherwise, the second call attempt 312 may be allowed and routed to voicemail based upon the call initiator correctly answering the captcha challenge.

In some examples, the policy table 400 may comprise a third policy 406. The third policy 406 may be mapped to criteria specifying that the second processing is to intercept and deny/drop the second call attempt 312 if the identified criteria indicates that the originating calling number is within a phone number set (B) and that the second timestamp of the second call attempt 312 is within a time interval (T).

Figure 5:
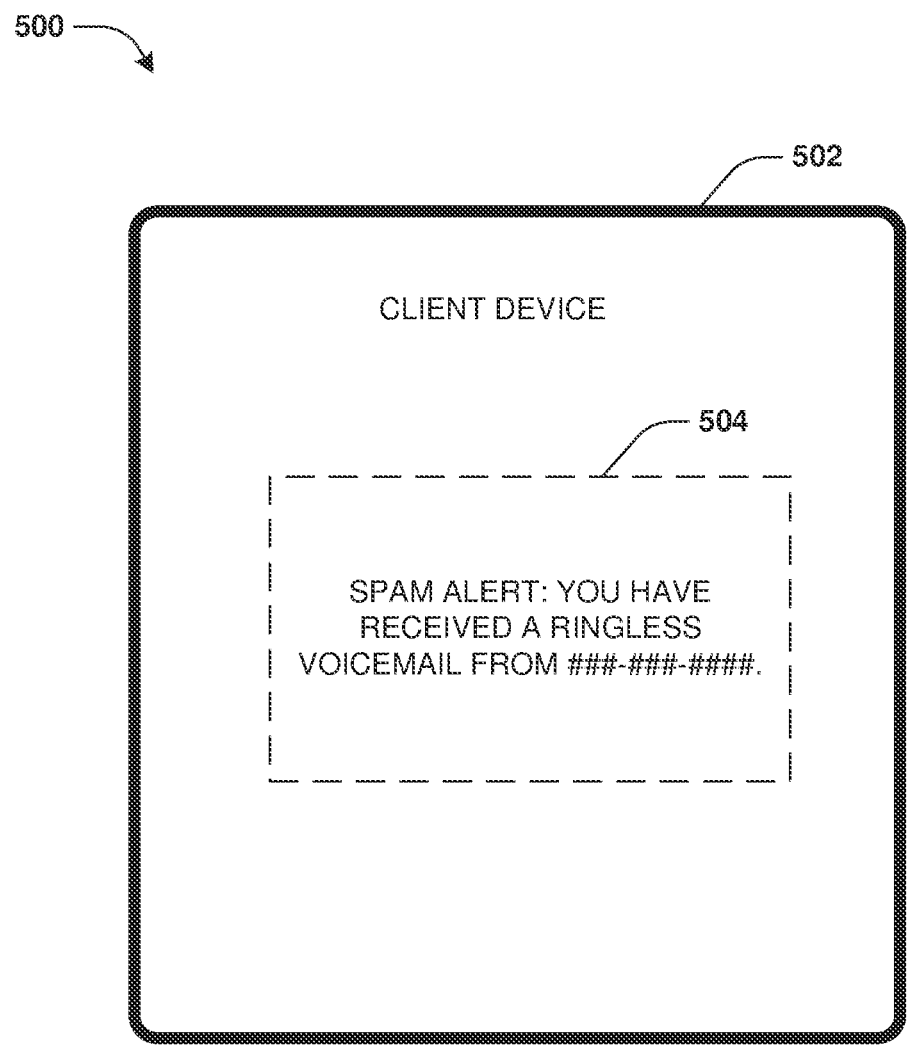
FIG. 5 is an illustration of an example of providing a message regarding a ringless voicemail attempt.

In some examples, the policy table 400 may comprise a fourth policy 408. The fourth policy 408 may be mapped to criteria specifying that the second processing is to play a recorded message for the second call attempt 312 and send a warning text message to the phone number of the client communication device 308 if the identified criteria indicates that the originating calling number is within a phone number set (A). The warning text message may be sent to the phone number of the client communication device 308 based upon the second call attempt 312 being routed to the service provider voicemail server 306 and voicemail of the phone number after the recorded message is played. FIG. 5 illustrates an example 500 of a warning text message 504 being provided to a client device 502, such as the client communication device 308. In some examples, a warning email, a push notification with a text warning, an audio warning, a visual warning, or other type of warning may be provided to indicate that the resulting ringless voicemail message may be spam.

In some examples, the policy table 400 may comprise a fifth policy 410. The fifth policy 410 may be mapped to criteria specifying that the second call attempt 312 is to be routed to the service provider voicemail server 306 and voicemail of the phone number if the identified criteria indicates that the originating calling number is not within the phone number set (B).

Figure 6:
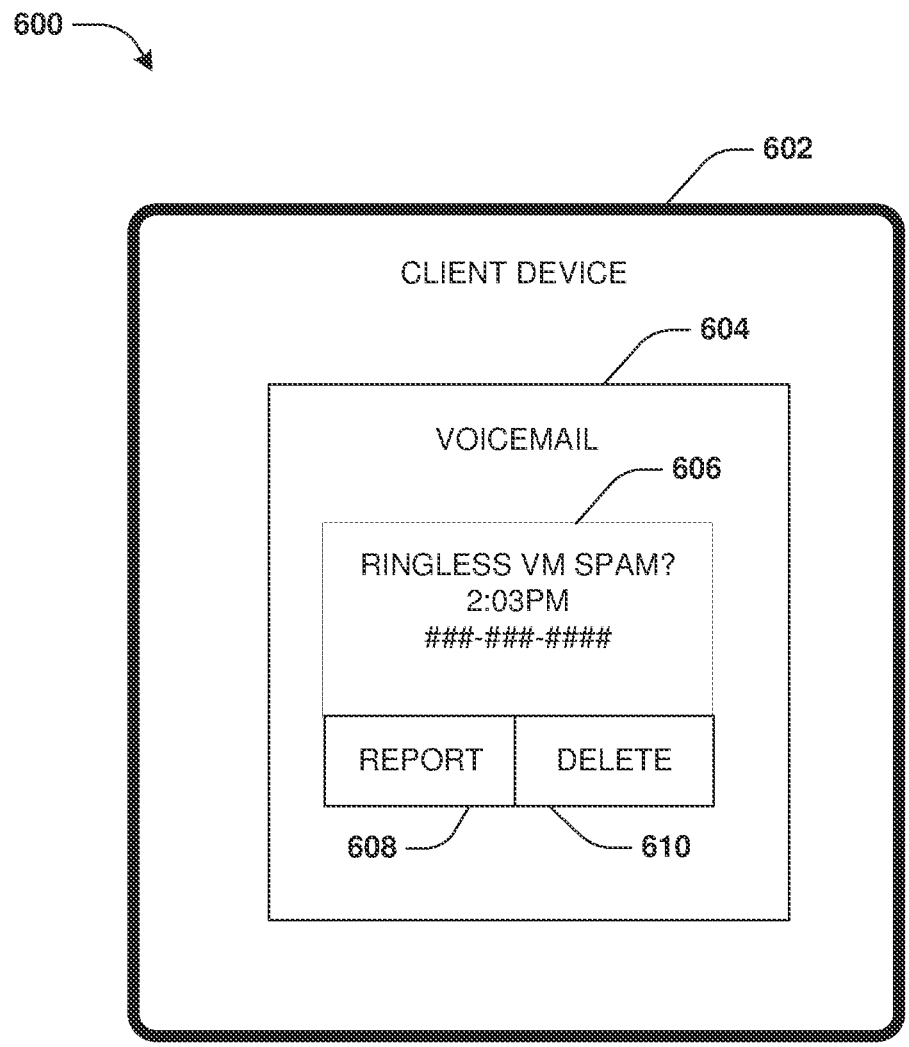
FIG. 6 is an illustration of an example of providing information and functionality regarding a ringless voicemail attempt.

In some examples, the policy table 400 may comprise a sixth policy 412. The sixth policy 412 may be mapped to criteria specifying that the second processing is to route the second call attempt 312 to the service provider voicemail server 306 and voicemail of the phone number, and that a resulting voicemail message is to be labeled with a warning label if the identified criteria indicates that the originating calling number is within a phone number set (C). FIG. 6 illustrates an example 600 of a warning label 606 being provided through a voicemail user interface 604 displayed on a client device 602, such as the client communication device 308. The warning label 606 may be displayed for the resulting voicemail message through the voicemail user interface 604. User interface elements, such as a report as spam button 608 and a delete button 610, may be populated within the voicemail user interface 604 so that a user can report the resulting voicemail message as spam and/or quickly delete the resulting voicemail message.

In some examples, statistics may be collected by the ringless voicemail detection functionality 322. The statistics may relate to the processing of call attempts, such as what originating calling numbers are attempting to deliver ringless voicemail messages to phone numbers, times of day when the ringless voicemail attempts are made, locations of originating calling numbers, whether users reported voicemail messages from certain originating calling numbers as spam, a volume of ringless voicemail attempts from certain originating calling numbers, whether users listened to ringless voicemail messages and/or performed certain actions in response to the ringless voicemail messages such as calling back an originating calling number, etc. The statistics may be utilized to modify the first threshold timespan, the second threshold timespan, actions specified by policies, criteria mapped to policies, and/or policies (e.g., adding a new policy to block an originating number based upon the originating number calling a honeypot number, removing a policy, modifying a policy, etc.). For example, if a large volume of new ringless voicemail attempts are originating from a particular originating calling number, then a new policy for the originating calling number may be created to specify that ringless voicemail attempts from the originating calling number are to be denied/blocked. In another example, a time interval criteria of a policy may be modified based upon timestamps of call attempts associated with ringless voicemail attempts. In another example, if a threshold number or percentage of users call back an originating calling number that left a ringless voicemail message that was labeled with a warning label, then a policy for the originating calling number may be removed because the originating calling number and resulting ringless voicemail messages may be safe and not spam. Originating calling numbers may be added to phone number sets and/or removed from phone number sets based upon the statistics.

Figure 7:
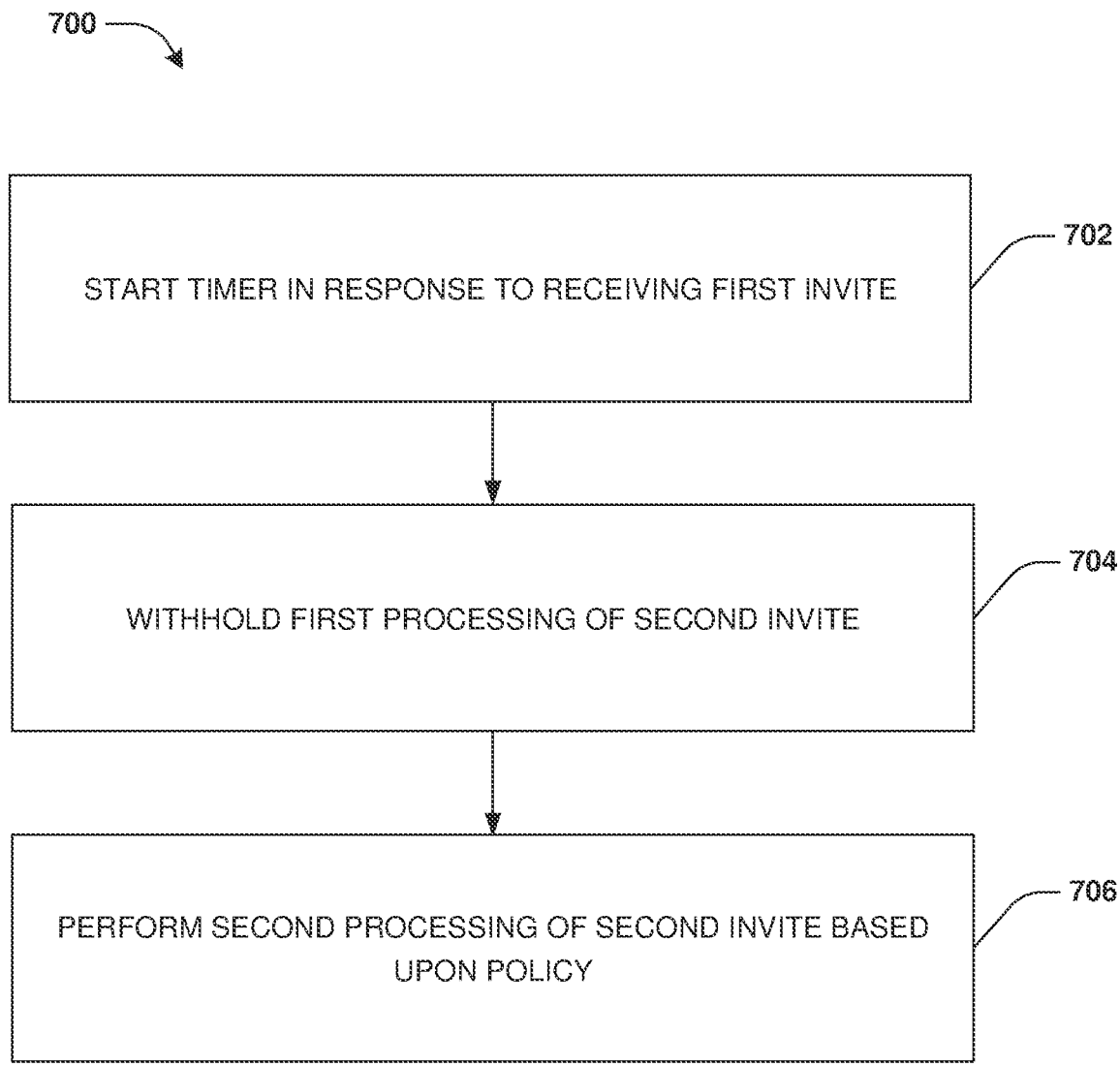
FIG. 7 is a flow chart illustrating an example method for detecting ringless voicemail attempts.

An embodiment of detecting ringless voicemail attempts is illustrated by an exemplary method 700 of FIG. 7. In some examples, the detection and processing of ringless voicemail attempts may be integrated into telephony-related feature implementations of a phone service provider, such as being integrated into the implementation of a session initiation protocol. During operation 702 of method 700, a timer is started in response to the phone service provider receiving a first invite associated with a first call attempt to a phone number of a client communication device. The first invite may have originated from a call initiator, and is received at a first point in time.

A second invite from the call initiator may be received at a second point in time. The second invite may correspond to a second call attempt to the phone number of the client communication device. During operation 704 of method 700, first processing of the second call attempt may be withheld in response to a determination that the second invite is received before a timeout of the timer (e.g., the timer may be set to a 2 second timeout value or any other value). As part of withholding the first processing of the second call attempt, the session initiation protocol may refrain from generating a busy code for the second invite that may have been otherwise generated as part of the first processing because the session initiation protocol may be currently establishing a phone call session for the first invite. The first processing may be withheld, for example, on the basis of a flag being set that indicates that a call to this particular phone number is in the process of being established, but has not been established yet. During operation 706 of method 700, second processing of the second invite may be performed based upon a policy. The second processing is performed in response to the first invite being cancelled before the timeout of the timer (or timeout of a second timer that is started when the first invite or the second invite is received). For example, the second invite (second call attempt) may be blocked, allowed, routed to a captcha challenge, provided with a recorded message, etc.

According to some embodiments, a method is provided. The method includes detecting a first call attempt to a phone number; in response to detecting a second call attempt to the phone number occurring within a first threshold timespan of the first call attempt being detected, withholding first processing of the second call attempt; and in response to the first call attempt being cancelled within a second threshold timespan of the first call attempt being detected, performing second processing of the second call attempt based upon a policy.

According to some embodiments, the method includes selecting the policy from a policy table mapping policies to criteria, wherein the policy is selected based upon the policy matching identified criteria associated with at least one of the first call attempt or the second call attempt.

According to some embodiments, the method includes denying the second call attempt based upon the policy.

According to some embodiments, the method includes allowing the second call attempt to be routed to voicemail associated with the phone number based upon the policy.

According to some embodiments, the method includes routing the second call attempt to a captcha challenge based upon the policy.

According to some embodiments, the method includes blocking the second call attempt from being routed to voicemail associated with the phone number based upon the policy.

According to some embodiments, the method includes playing a recorded message for the second call attempt based upon the policy.

According to some embodiments, the method includes allowing the second call attempt to be routed to voicemail associated with the phone number based upon the policy; and displaying a warning label for a voicemail message resulting from the second call attempt.

According to some embodiments, the method includes allowing the second call attempt to be routed to voicemail associated with the phone number based upon the policy; and displaying a user interface element through which a user can report a voicemail message resulting from the second call attempt.

According to some embodiments, the method includes allowing the second call attempt to be routed to voicemail associated with the phone number based upon the policy; and displaying a user interface element through which a user can delete a voicemail message resulting from the second call attempt.

According to some embodiments, the method includes collecting statistics regarding call attempts to phone numbers; and modifying the policy based upon the statistics.

According to some embodiments, the method includes collecting statistics regarding call attempts to phone numbers; and modifying at least one of the first threshold timespan or the second threshold timespan based upon the statistics.

According to some embodiments, the method includes collecting statistics regarding call attempts to phone numbers; and modifying criteria, utilized to select the policy from a set of policies, based upon the statistics.

According to some embodiments, the method includes transmitting a text message, regarding the second call attempt, to the phone number based upon the policy.

According to some embodiments, a non-transitory computer-readable medium storing instructions that when executed facilitate performance of operations, is provided. The operations include starting a timer in response to receiving a first invite associated with a first call attempt to a phone number; in response to receiving a second invite associated with a second call attempt to the phone number before a timeout of the timer, withholding first processing of the second invite; and in response to the first invite being cancelled before the timeout of the timer, performing second processing of the second invite based upon a policy.

According to some embodiments, the operations include refraining from generating a busy code for the second invite.

According to some embodiments, the operations are implemented in association with a session initiation protocol.

According to some embodiments, the operations include collecting statistics regarding invite processing; and modifying the policy based upon the statistics.

According to some embodiments, a system is provided. The system comprises a processor coupled to memory, the processor configured to execute instructions to perform operations. The operations include determining that a first call attempt and a second call attempt were made to a phone number, wherein the first call attempt occurred at a first time, the second call attempt occurred at a second time, the second time within a first threshold timespan of the first time, and the first call attempt was cancelled within a second threshold timespan from the first time; identifying criteria associated with at least one of the first call attempt or the second call attempt as identified criteria; selecting a policy from a set of policies mapped to a set of criteria based upon the policy being mapped to the identified criteria; and processing the second call attempt based upon the policy.

According to some embodiments, the operations include blocking generation of a busy code related to the second call attempt.

Figure 8:
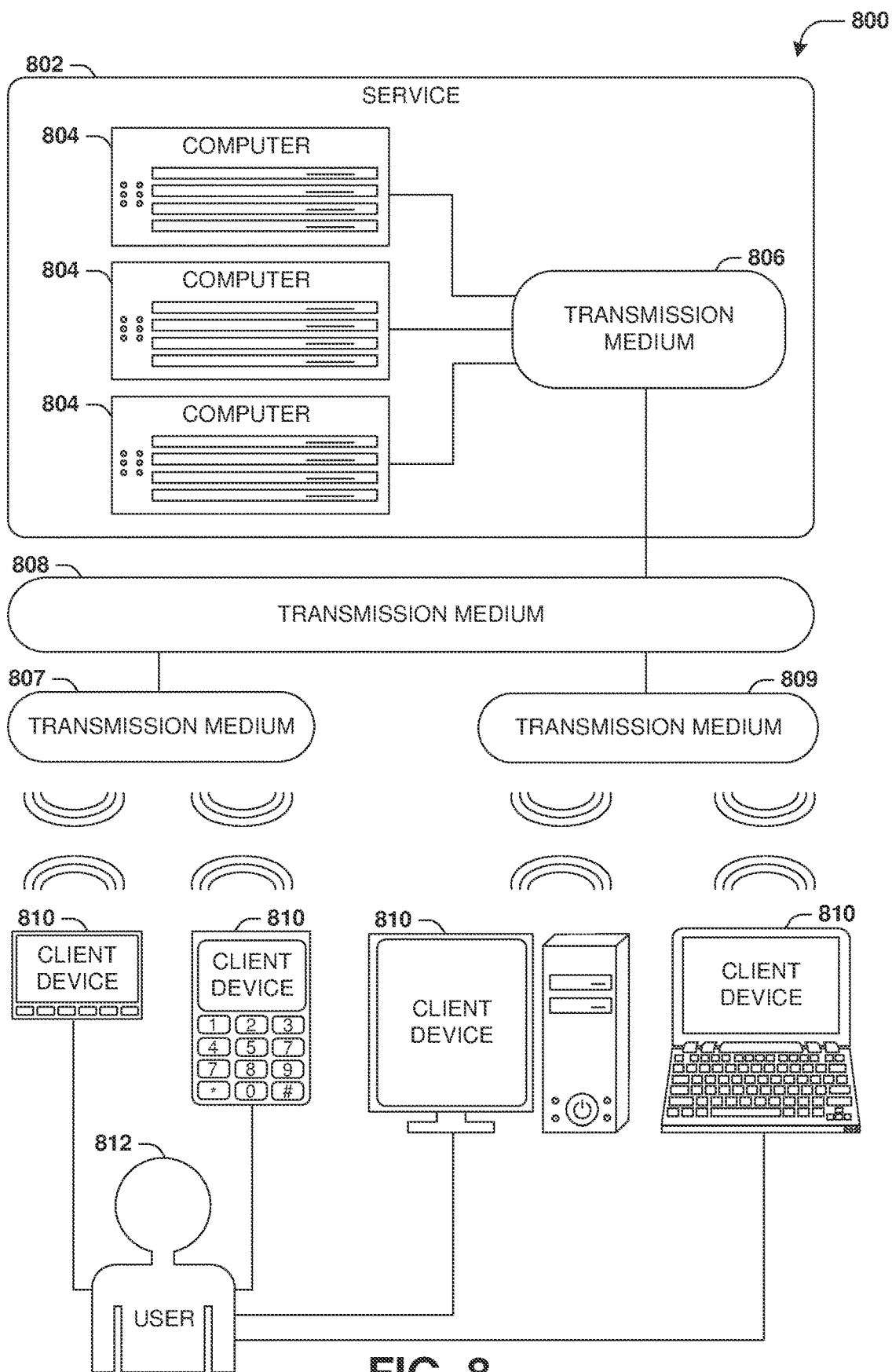
FIG. 8 is an illustration of example networks that may utilize and/or implement at least a portion of the techniques presented herein.

FIG. 8 is an interaction diagram of a scenario 800 illustrating a service 802 provided by a set of computers 804 to a set of client devices 810 via various types of transmission mediums. The computers 804 and/or client devices 810 may be capable of transmitting, receiving, processing, and/or storing many types of signals, such as in memory as physical memory states.

The computers 804 of the service 802 may be communicatively coupled together, such as for exchange of communications using a transmission medium 806. The transmission medium 806 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 802.

Likewise, the transmission medium 806 may comprise one or more sub-networks, such as may employ different architectures, may be compliant or compatible with differing protocols and/or may interoperate within the transmission medium 806. Additionally, various types of transmission medium 806 may be interconnected (e.g., a router may provide a link between otherwise separate and independent transmission medium 806).

In scenario 800 of FIG. 8, the transmission medium 806 of the service 802 is connected to a transmission medium 808 that allows the service 802 to exchange data with other services 802 and/or client devices 810. The transmission medium 808 may encompass various combinations of devices with varying levels of distribution and exposure, such as a public wide-area network and/or a private network (e.g., a virtual private network (VPN) of a distributed enterprise).

In the scenario 800 of FIG. 8, the service 802 may be accessed via the transmission medium 808 by a user 812 of one or more client devices 810, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 810 may communicate with the service 802 via various communicative couplings to the transmission medium 808. As a first such example, one or more client devices 810 may comprise a cellular communicator and may communicate with the service 802 by connecting to the transmission medium 808 via a transmission medium 807 provided by a cellular provider. As a second such example, one or more client devices 810 may communicate with the service 802 by connecting to the transmission medium 808 via a transmission medium 809 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 804 and the client devices 810 may communicate over various types of transmission mediums.

Figure 9:
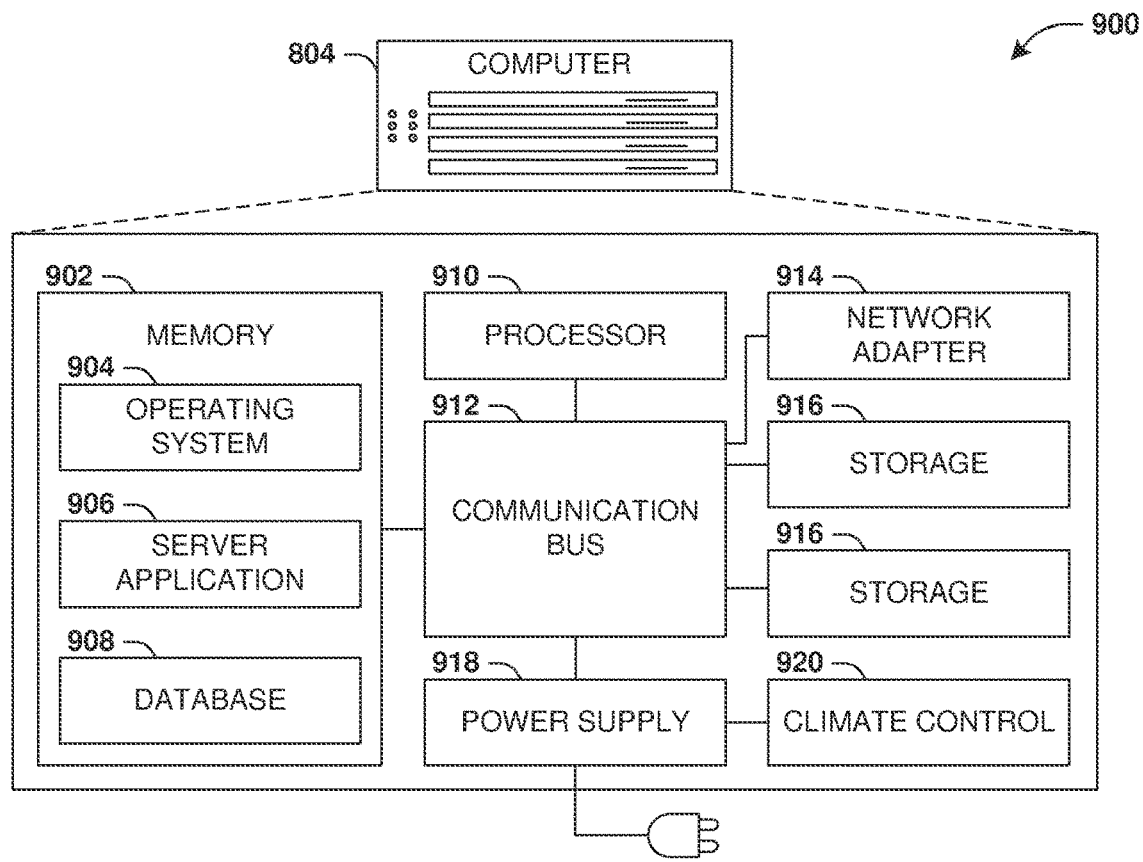
FIG. 9 is an illustration of a scenario involving an example configuration of a computer that may utilize and/or implement at least a portion of the techniques presented herein.

FIG. 9 presents a schematic architecture diagram 900 of a computer 804 that may utilize at least a portion of the techniques provided herein. Such a computer 804 may vary widely in configuration or capabilities, alone or in conjunction with other computers, in order to provide a service such as the service 802.

The computer 804 may comprise one or more processors 910 that process instructions. The one or more processors 910 may optionally include a plurality of cores; one or more coprocessors, such as a mathematics coprocessor or an integrated graphical processing unit (GPU); and/or one or more layers of local cache memory. The computer 804 may comprise memory 902 storing various forms of applications, such as an operating system 904; one or more computer applications 906; and/or various forms of data, such as a database 908 or a file system. The computer 804 may comprise a variety of peripheral components, such as a wired and/or wireless network adapter 914 connectible to a local area network and/or wide area network; one or more storage components 916, such as a hard disk drive, a solid-state storage device (SSD), a flash memory device, and/or a magnetic and/or optical disk reader.

The computer 804 may comprise a mainboard featuring one or more communication buses 912 that interconnect the processor 910, the memory 902, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 912 may interconnect the computer 804 with at least one other computer. Other components that may optionally be included with the computer 804 (though not shown in the schematic architecture diagram 900 of FIG. 9) include a display; a display adapter, such as a graphical processing unit (GPU); input peripherals, such as a keyboard and/or mouse; and a flash memory device that may store a basic input/output system (BIOS) routine that facilitates booting the computer 804 to a state of readiness.

The computer 804 may operate in various physical enclosures, such as a desktop or tower, and/or may be integrated with a display as an "all-in-one" device. The computer 804 may be mounted horizontally and/or in a cabinet or rack, and/or may simply comprise an interconnected set of components. The computer 804 may comprise a dedicated and/or shared power supply 918 that supplies and/or regulates power for the other components. The computer 804 may provide power to and/or receive power from another computer and/or other devices. The computer 804 may comprise a shared and/or dedicated climate control unit 920 that regulates climate properties, such as temperature, humidity, and/or airflow. Many such computers 804 may be configured and/or adapted to utilize at least a portion of the techniques presented herein.

Figure 10:
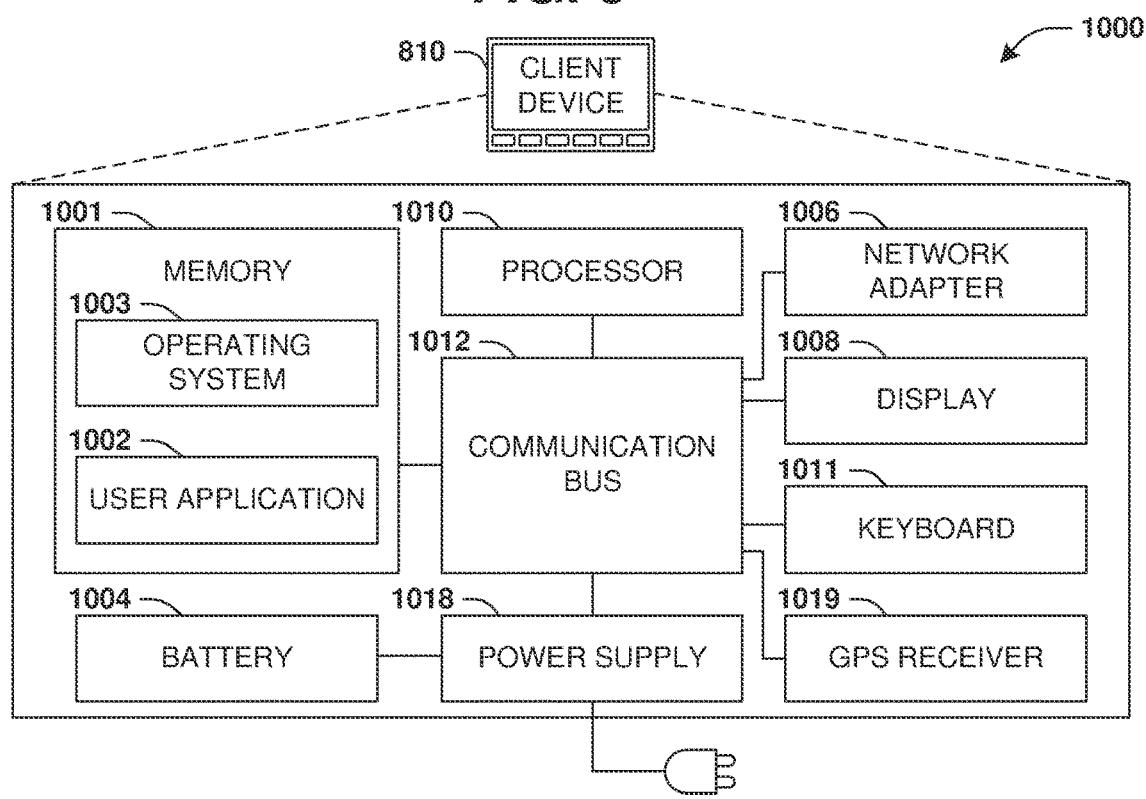
FIG. 10 is an illustration of a scenario involving an example configuration of a client that may utilize and/or implement at least a portion of the techniques presented herein.

FIG. 10 presents a schematic architecture diagram 1000 of a client device 810 whereupon at least a portion of the techniques presented herein may be implemented. Such a client device 810 may vary widely in configuration or capabilities, in order to provide a variety of functionality to a user such as the user 812. The client device 810 may be provided in a variety of form factors, such as a desktop or tower workstation; an "all-in-one" device integrated with a display 1008; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 810 may serve the user in a variety of roles, such as a workstation, kiosk, media player, gaming device, and/or appliance.

The client device 810 may comprise one or more processors 1010 that process instructions. The one or more processors 1010 may optionally include a plurality of cores; one or more coprocessors, such as a mathematics coprocessor or an integrated graphical processing unit (GPU); and/or one or more layers of local cache memory. The client device 810 may comprise memory 1001 storing various forms of applications, such as an operating system 1003; one or more user applications 1002, such as document applications, media applications, file and/or data access applications, communication applications such as web browsers and/or email clients, utilities, and/or games; and/or drivers for various peripherals. The client device 810 may comprise a variety of peripheral components, such as a wired and/or wireless network adapter 1006 connectible to a local area network and/or wide area network; one or more output components, such as a display 1008 coupled with a display adapter (optionally including a graphical processing unit (GPU)), a sound adapter coupled with a speaker, and/or a printer; input devices for receiving input from the user, such as a keyboard 1011, a mouse, a microphone, a camera, and/or a touch-sensitive component of the display 1008; and/or environmental sensors, such as a global positioning system (GPS) receiver 1019 that detects the location, velocity, and/or acceleration of the client device 810, a compass, accelerometer, and/or gyroscope that detects a physical orientation of the client device 810. Other components that may optionally be included with the client device 810 (though not shown in the schematic architecture diagram 1000 of FIG. 10) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 810 to a state of readiness; and a climate control unit that regulates climate properties, such as temperature, humidity, and airflow.

The client device 810 may comprise a mainboard featuring one or more communication buses 1012 that interconnect the processor 1010, the memory 1001, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 810 may comprise a dedicated and/or shared power supply 1018 that supplies and/or regulates power for other components, and/or a battery 1004 that stores power for use while the client device 810 is not connected to a power source via the power supply 1018. The client device 810 may provide power to and/or receive power from other client devices.

Figure 11:
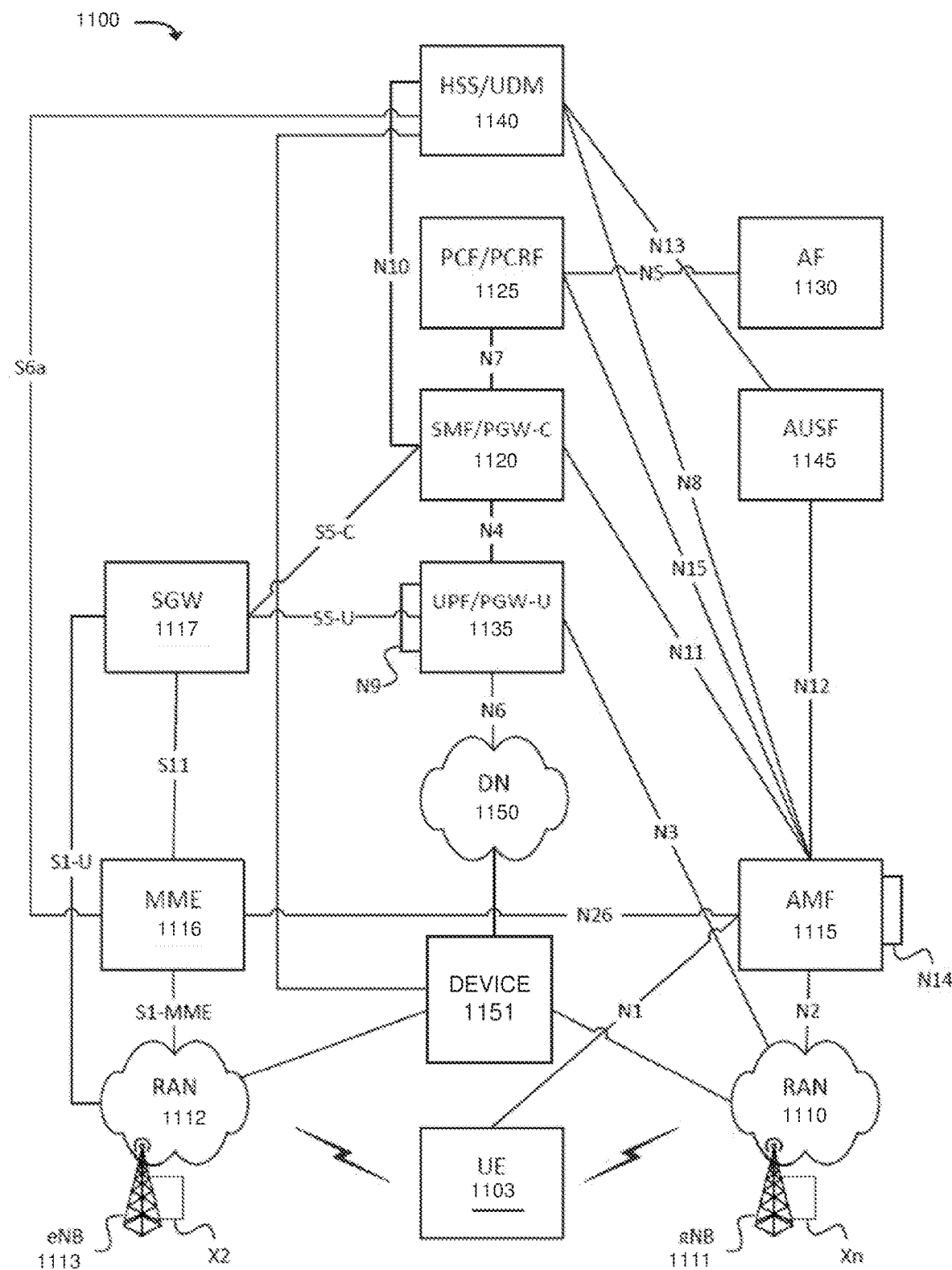
FIG. 11 is an illustration of an example environment in which at least a portion of the techniques presented herein may be utilized and/or implemented.

FIG. 11 illustrates an example environment 1100, in which one or more embodiments may be implemented. In some embodiments, environment 1100 may correspond to a Fifth Generation ("5G") network, and/or may include elements of a 5G network. In some embodiments, environment 1100 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1100 may include UE 1103, RAN 1110 (which may include one or more Next Generation Node Bs ("gNBs") 1111), RAN 1112 (which may include one or more one or more evolved Node Bs ("eNBs") 1113), and various network functions such as Access and Mobility Management Function ("AMF") 1115, Mobility Management Entity ("MME") 1116, Serving Gateway ("SGW") 1117, Session Management Function ("SMF")/Packet Data Network ("PDN") Gateway ("PGW")-Control plane function ("PGW-C") 1120, Policy Control Function ("PCF")/Policy Charging and Rules Function ("PCRF") 1125, Application Function ("AF") 1130, User Plane Function ("UPF")/PGW-User plane function ("PGW-U") 1135, Home Subscriber Server ("HSS")/Unified Data Management ("UDM") 1140, and Authentication Server Function ("AUSF") 1145. Environment 1100 may also include one or more networks, such as Data Network ("DN") 1150. Environment 1100 may include one or more additional devices or systems communicatively coupled to one or more networks (e.g., DN 1150), such as device 1151 corresponding to a voice command device, a communication device, an authentication service, a messaging service, a service, a client device capable of identifying users, a client device capable of authenticating users, etc.

The example shown in FIG. 11 illustrates one instance of each network component or function (e.g., one instance of SMF/PGW-C 1120, PCF/PCRF 1125, UPF/PGW-U 1135, HSS/UDM 1140, and/or 1145). In practice, environment 1100 may include multiple instances of such components or functions. For example, in some embodiments, environment 1100 may include multiple "slices" of a core network, where each slice includes a discrete set of network functions (e.g., one slice may include a first instance of SMF/PGW-C 1120, PCF/PCRF 1125, UPF/PGW-U 1135, HSS/UDM 1140, and/or 1145, while another slice may include a second instance of SMF/PGW-C 1120, PCF/PCRF 1125, UPF/PGW-U 1135, HSS/UDM 1140, and/or 1145). The different slices may provide differentiated levels of service, such as service in accordance with different Quality of Service ("QoS") parameters.

The quantity of devices and/or networks, illustrated in FIG. 11, is provided for explanatory purposes only. In practice, environment 1100 may include additional devices and/or networks, fewer devices and/or networks, different devices and/or networks, or differently arranged devices and/or networks than illustrated in FIG. 11. For example, while not shown, environment 1100 may include devices that facilitate or enable communication between various components shown in environment 1100, such as routers, modems, gateways, switches, hubs, etc. Alternatively and/or additionally, one or more of the devices of environment 1100 may perform one or more network functions described as being performed by another one or more of the devices of environment 1100. Devices of environment 1100 may interconnect with each other and/or other devices via wired connections, wireless connections, or a combination of wired and wireless connections. In some implementations, one or more devices of environment 1100 may be physically integrated in, and/or may be physically attached to, one or more other devices of environment 1100.

UE 1103 may include a computation and communication device, such as a wireless mobile communication device that is capable of communicating with RAN 1110, RAN 1112, and/or DN 1150. UE 1103 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 1103 may send traffic to and/or receive traffic (e.g., user plane traffic) from DN 1150 via RAN 1110, RAN 1112, and/or UPF/PGW-U 1135.

RAN 1110 may be, or may include, a 5G RAN that includes one or more base stations (e.g., one or more gNBs 1111), via which UE 1103 may communicate with one or more other elements of environment 1100. UE 1103 may communicate with RAN 1110 via an air interface (e.g., as provided by gNB 1111). For instance, RAN 1110 may receive traffic (e.g., voice call traffic, data traffic, messaging traffic, signaling traffic, etc.) from UE 1103 via the air interface, and may communicate the traffic to UPF/PGW-U 1135, and/or one or more other devices or networks. Similarly, RAN 1110 may receive traffic intended for UE 1103 (e.g., from UPF/PGW-U 1135, AMF 1115, and/or one or more other devices or networks) and may communicate the traffic to UE 1103 via the air interface.

RAN 1112 may be, or may include, a LTE RAN that includes one or more base stations (e.g., one or more eNBs 1113), via which UE 1103 may communicate with one or more other elements of environment 1100. UE 1103 may communicate with RAN 1112 via an air interface (e.g., as provided by eNB 1113). For instance, RAN 1110 may receive traffic (e.g., voice call traffic, data traffic, messaging traffic, signaling traffic, etc.) from UE 1103 via the air interface, and may communicate the traffic to UPF/PGW-U 1135, and/or one or more other devices or networks. Similarly, RAN 1110 may receive traffic intended for UE 1103 (e.g., from UPF/PGW-U 1135, SGW 1117, and/or one or more other devices or networks) and may communicate the traffic to UE 1103 via the air interface.

AMF 1115 may include one or more devices, systems, Virtualized Network Functions ("VNFs"), etc., that perform operations to register UE 1103 with the 5G network, to establish bearer channels associated with a session with UE 1103, to hand off UE 1103 from the 5G network to another network, to hand off UE 1103 from the other network to the 5G network, manage mobility of UE 1103 between RANs 1110 and/or gNBs 1111, and/or to perform other operations. In some embodiments, the 5G network may include multiple AMFs 1115, which communicate with each other via the N14 interface (denoted in FIG. 11 by the line marked "N14" originating and terminating at AMF 1115).

MME 1116 may include one or more devices, systems, VNFs, etc., that perform operations to register UE 1103 with the EPC, to establish bearer channels associated with a session with UE 1103, to hand off UE 1103 from the EPC to another network, to hand off UE 1103 from another network to the EPC, manage mobility of UE 1103 between RANs 1112 and/or eNBs 1113, and/or to perform other operations.

SGW 1117 may include one or more devices, systems, VNFs, etc., that aggregate traffic received from one or more eNBs 1113 and send the aggregated traffic to an external network or device via UPF/PGW-U 1135. Additionally, SGW 1117 may aggregate traffic received from one or more UPF/PGW-Us 1135 and may send the aggregated traffic to one or more eNBs 1113. SGW 1117 may operate as an anchor for the user plane during inter-eNB handovers and as an anchor for mobility between different telecommunication networks or RANs (e.g., RANs 1110 and 1112).

SMF/PGW-C 1120 may include one or more devices, systems, VNFs, etc., that gather, process, store, and/or provide information in a manner described herein. SMF/PGW-C 1120 may, for example, facilitate in the establishment of communication sessions on behalf of UE 1103. In some embodiments, the establishment of communications sessions may be performed in accordance with one or more policies provided by PCF/PCRF 1125.

PCF/PCRF 1125 may include one or more devices, systems, VNFs, etc., that aggregate information to and from the 5G network and/or other sources. PCF/PCRF 1125 may receive information regarding policies and/or subscriptions from one or more sources, such as subscriber databases and/or from one or more users (such as, for example, an administrator associated with PCF/PCRF 1125).

AF 1130 may include one or more devices, systems, VNFs, etc., that receive, store, and/or provide information that may be used in determining parameters (e.g., quality of service parameters, charging parameters, or the like) for certain applications.

UPF/PGW-U 1135 may include one or more devices, systems, VNFs, etc., that receive, store, and/or provide data (e.g., user plane data). For example, UPF/PGW-U 1135 may receive user plane data (e.g., voice call traffic, data traffic, etc.), destined for UE 1103, from DN 1150, and may forward the user plane data toward UE 1103 (e.g., via RAN 1110, SMF/PGW-C 1120, and/or one or more other devices). In some embodiments, multiple UPFs 1135 may be deployed (e.g., in different geographical locations), and the delivery of content to UE 1103 may be coordinated via the N9 interface (e.g., as denoted in FIG. 11 by the line marked "N9" originating and terminating at UPF/PGW-U 1135). Similarly, UPF/PGW-U 1135 may receive traffic from UE 1103 (e.g., via RAN 1110, SMF/PGW-C 1120, and/or one or more other devices), and may forward the traffic toward DN 1150. In some embodiments, UPF/PGW-U 1135 may communicate (e.g., via the N4 interface) with SMF/PGW-C 1120, regarding user plane data processed by UPF/PGW-U 1135.

HSS/UDM 1140 and AUSF 1145 may include one or more devices, systems, VNFs, etc., that manage, update, and/or store, in one or more memory devices associated with AUSF 1145 and/or HSS/UDM 1140, profile information associated with a subscriber. AUSF 1145 and/or HSS/UDM 1140 may perform authentication, authorization, and/or accounting operations associated with the subscriber and/or a communication session with UE 1103.

DN 1150 may include one or more wired and/or wireless networks. For example, DN 1150 may include an Internet Protocol ("IP")-based PDN, a wide area network ("WAN") such as the Internet, a private enterprise network, and/or one or more other networks. UE 1103 may communicate, through DN 1150, with data servers, other UEs UE 1103, and/or to other servers or applications that are coupled to DN 1150. DN 1150 may be connected to one or more other networks, such as a public switched telephone network ("PSTN"), a public land mobile network ("PLMN"), and/or another network. DN 1150 may be connected to one or more devices, such as content providers, applications, web servers, and/or other devices, with which UE 1103 may communicate.

The device 1151 may include one or more devices, systems, VNFs, etc., that perform one or more operations described herein. For example, the device 1151 detect voice commands, facilitate the creation of accounts, and/or perform actions associated with the accounts.

Figure 12:
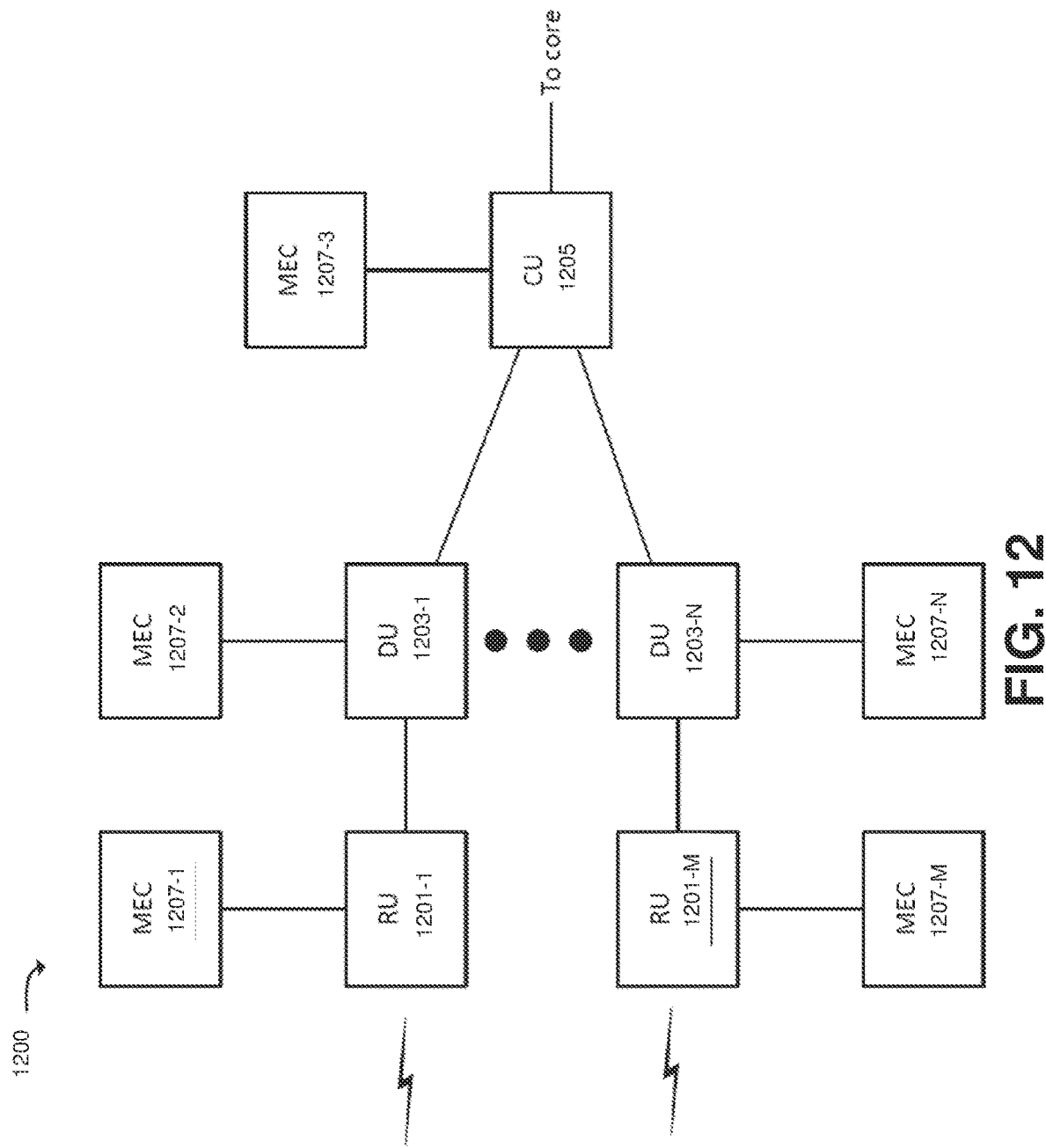
FIG. 12 is an illustration of an example network that may utilize and/or implement at least a portion of the techniques presented herein.

FIG. 12 illustrates an example Distributed Unit ("DU") network 1200, which may be included in and/or implemented by one or more RANs (e.g., RAN 1110, RAN 1112, or some other RAN). In some embodiments, a particular RAN may include one DU network 1200. In some embodiments, a particular RAN may include multiple DU networks 1200. In some embodiments, DU network 1200 may correspond to a particular gNB 1111 of a 5G RAN (e.g., RAN 1110). In some embodiments, DU network 1200 may correspond to multiple gNBs 1111. In some embodiments, DU network 1200 may correspond to one or more other types of base stations of one or more other types of RANs. As shown, DU network 1200 may include Central Unit ("CU") 1205, one or more Distributed Units ("DUs") 1203-1 through 1203-N (referred to individually as "DU 1203," or collectively as "DUs 1203"), and one or more Radio Units ("RUs") 1201-1 through 1201-M (referred to individually as "RU 1201," or collectively as "RUs 1201").

CU 1205 may communicate with a core of a wireless network (e.g., may communicate with one or more of the devices or systems described above with respect to FIG. 11, such as AMF 1115 and/or UPF/PGW-U 1135). In the uplink direction (e.g., for traffic from UEs UE 1103 to a core network), CU 1205 may aggregate traffic from DUs 1203, and forward the aggregated traffic to the core network. In some embodiments, CU 1205 may receive traffic according to a given protocol (e.g., Radio Link Control ("RLC")) from DUs 1203, and may perform higher-layer processing (e.g., may aggregate/process RLC packets and generate Packet Data Convergence Protocol ("PDCP") packets based on the RLC packets) on the traffic received from DUs 1203.

In accordance with some embodiments, CU 1205 may receive downlink traffic (e.g., traffic from the core network) for a particular UE 1103, and may determine which DU(s) 1203 should receive the downlink traffic. DU 1203 may include one or more devices that transmit traffic between a core network (e.g., via CU 1205) and UE 1103 (e.g., via a respective RU 1201). DU 1203 may, for example, receive traffic from RU 1201 at a first layer (e.g., physical ("PHY") layer traffic, or lower PHY layer traffic), and may process/aggregate the traffic to a second layer (e.g., upper PHY and/or RLC). DU 1203 may receive traffic from CU 1205 at the second layer, may process the traffic to the first layer, and provide the processed traffic to a respective RU 1201 for transmission to UE 1103.

RU 1201 may include hardware circuitry (e.g., one or more RF transceivers, antennas, radios, and/or other suitable hardware) to communicate wirelessly (e.g., via an RF interface) with one or more UEs UE 1103, one or more other DUs 1203 (e.g., via RUs 1201 associated with DUs 1203), and/or any other suitable type of device. In the uplink direction, RU 1201 may receive traffic from UE 1103 and/or another DU 1203 via the RF interface and may provide the traffic to DU 1203. In the downlink direction, RU 1201 may receive traffic from DU 1203, and may provide the traffic to UE 1103 and/or another DU 1203.

RUs 1201 may, in some embodiments, be communicatively coupled to one or more Multi-Access/Mobile Edge Computing ("MEC") devices, referred to sometimes herein simply as ("MECs") 1207. For example, RU 1201-1 may be communicatively coupled to MEC 1207-1, RU 1201-M may be communicatively coupled to MEC 1207-M, DU 1203-1 may be communicatively coupled to MEC 1207-2, DU 1203-N may be communicatively coupled to MEC 1207-N, CU 1205 may be communicatively coupled to MEC 1207-3, and so on. MECs 1207 may include hardware resources (e.g., configurable or provisionable hardware resources) that may be configured to provide services and/or otherwise process traffic to and/or from UE 1103, via a respective RU 1201.

For example, RU 1201-1 may route some traffic, from UE 1103, to MEC 1207-1 instead of to a core network (e.g., via DU 1203 and CU 1205). MEC 1207-1 may process the traffic, perform one or more computations based on the received traffic, and may provide traffic to UE 1103 via RU 1201-1. In this manner, ultra-low latency services may be provided to UE 1103, as traffic does not need to traverse DU 1203, CU 1205, and an intervening backhaul network between DU network 1200 and the core network. In some embodiments, MEC 1207 may include, and/or may implement some or all of the functionality described above with respect to the device 1151, such as a voice command device, a communication device, an authentication service, a messaging service, a service, and/or a user device.

Figure 13:
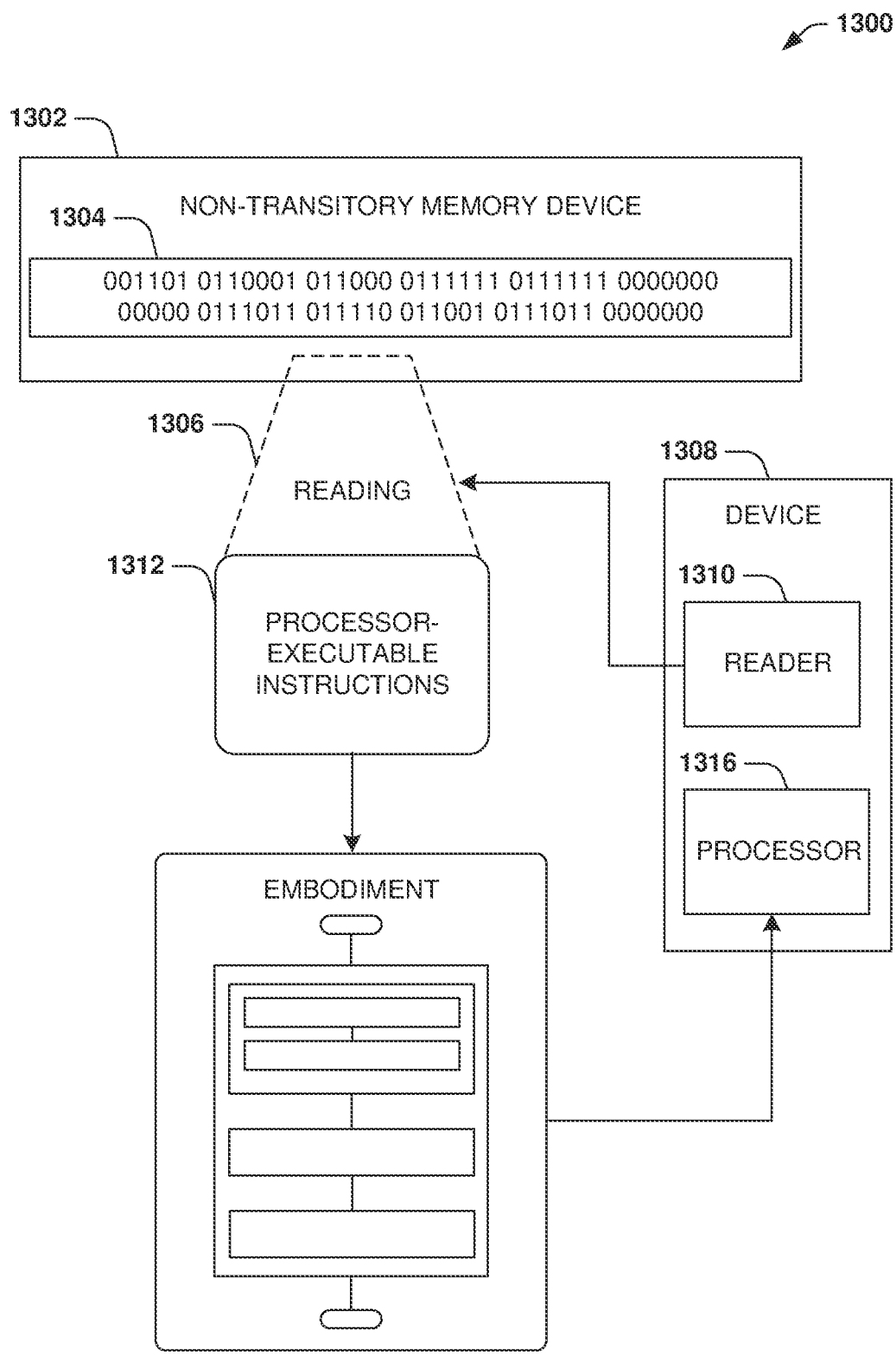
FIG. 13 is an illustration of a scenario featuring an example non-transitory machine readable medium in accordance with one or more of the provisions set forth herein.

FIG. 13 is an illustration of a scenario 1300 involving an example non-transitory machine readable medium 1302. The non-transitory machine readable medium 1302 may comprise processor-executable instructions 1312 that when executed by a processor 1316 cause performance (e.g., by the processor 1316) of at least some of the provisions herein. The non-transitory machine readable medium 1302 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 1302 stores computer-readable data 1304 that, when subjected to reading 1306 by a reader 1310 of a device 1308 (e.g., a read head of a hard disk drive, or a read operation invoked on a solid-state storage device), express the processor-executable instructions 1312. In some embodiments, the processor-executable instructions 1312, when executed cause performance of operations, such as at least some of the example method 200 of FIG. 2 and/or example method 700 of FIG. 7, for example. In some embodiments, the processor-executable instructions 1312 are configured to cause implementation of a system, such as at least some of the example system 300 of FIG. 3, for example.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   detecting a first call attempt to a phone number;
   in response to detecting a second call attempt to the phone number occurring within a first threshold timespan of the first call attempt being detected, withholding first processing of the second call attempt; and
   in response to the first call attempt being cancelled within a second threshold timespan of the first call attempt being detected, performing second processing of the second call attempt based upon a policy.

2. The method of claim 1, comprising:
   selecting the policy from a policy table mapping policies to criteria, wherein the policy is selected based upon the policy matching identified criteria associated with at least one of the first call attempt or the second call attempt.

3. The method of claim 1, wherein the second processing comprises:
   denying the second call attempt based upon the policy.

4. The method of claim 1, wherein the second processing comprises:
   allowing the second call attempt to be routed to voicemail associated with the phone number based upon the policy.

5. The method of claim 1, wherein the second processing comprises at least one of:
   routing the second call attempt to a captcha challenge based upon the policy;
   blocking the second call attempt from being routed to voicemail associated with the phone number based upon the policy; or
   playing a recorded message for the second call attempt based upon the policy.

6. The method of claim 1, wherein the first call attempt and the second call attempt target a destination address, and wherein the method comprises:
   configuring a session initiation protocol to allow no more than a single call attempt to the destination address, wherein the session initiation protocol blocks the second call attempt based upon the first call attempt being in a setup state.

7. The method of claim 1, wherein the first call attempt and the second call attempt target a destination address, and wherein the method comprises:
   setting a flag to a first value to indicate that the first call attempt has a setup state for the destination addresses;

blocking the second call attempt to the destination address based upon the flag having the first value; and in response to the first call attempt no longer having the setup state, setting the flag to a second value.

8. The method of claim 1, wherein the second processing comprises:

allowing the second call attempt to be routed to voicemail associated with the phone number based upon the policy; and displaying a warning label for a voicemail message resulting from the second call attempt.

9. The method of claim 1, wherein the second processing comprises:

allowing the second call attempt to be routed to voicemail associated with the phone number based upon the policy; and displaying a user interface element through which a user can report a voicemail message resulting from the second call attempt.

10. The method of claim 1, wherein the second processing comprises:

allowing the second call attempt to be routed to voicemail associated with the phone number based upon the policy; and displaying a user interface element through which a user can delete a voicemail message resulting from the second call attempt.

11. The method of claim 1, comprising:

collecting statistics regarding call attempts to phone numbers; and modifying the policy based upon the statistics.

12. The method of claim 1, comprising:

collecting statistics regarding call attempts to phone numbers; and modifying at least one of the first threshold timespan or the second threshold timespan based upon the statistics.

13. The method of claim 1, comprising:

collecting statistics regarding call attempts to phone numbers; and modifying criteria, utilized to select the policy from a set of policies, based upon the statistics.

14. The method of claim 1, wherein the second processing comprises:

transmitting a text message, regarding the second call attempt, to the phone number based upon the policy.

15. A system comprising:

a memory comprising instructions; and a processor coupled to the memory, the processor configured to execute the instructions to facilitate performance of operations comprising:

starting a timer in response to receiving a first invite associated with a first call attempt to a phone number;

in response to receiving a second invite associated with a second call attempt to the phone number before a timeout of the timer, withholding first processing of the second invite; and in response to the first invite being cancelled before the timeout of the timer, performing second processing of the second invite based upon a policy.

16. The system of claim 15, wherein the operations comprise:

refraining from generating a busy code for the second invite.

17. The system of claim 15, wherein the operations are implemented in association with a session initiation protocol.

18. The system of claim 14, wherein the operations comprise:

collecting statistics regarding invite processing.

19. The system of claim 18, wherein the operations comprise:

modifying the policy based upon the statistics.

20. A non-transitory computer-readable medium storing instructions that when executed facilitate performance of operations comprising:

determining that a first call attempt and a second call attempt were made to a phone number, wherein the first call attempt occurred at a first time, the second call attempt occurred at a second time, the second time within a first threshold timespan of the first time, and the first call attempt was cancelled within a second threshold timespan from the first time;

identifying criteria associated with at least one of the first call attempt or the second call attempt as identified criteria;

selecting a policy from a set of policies mapped to a set of criteria based upon the policy being mapped to the identified criteria; and processing the second call attempt based upon the policy.

* * * * *